United States Patent [19]
Kim

[11] Patent Number: 5,134,467
[45] Date of Patent: Jul. 28, 1992

[54] LUMINANCE/CHROMATICITY SIGNAL SEPARATION CIRCUIT FOR COMPOSITE VIDEO SIGNAL

[75] Inventor: Kee H. Kim, Seoul, Rep. of Korea
[73] Assignee: Goldstar Co., Ltd., Seoul, Rep. of Korea
[21] Appl. No.: 625,828
[22] Filed: Dec. 11, 1990

[30] Foreign Application Priority Data
Dec. 12, 1989 [KR] Rep. of Korea ........... 18407/1989

[51] Int. Cl.$^5$ .................................. H04N 9/78
[52] U.S. Cl. ...................................... 358/31
[58] Field of Search ................ 358/31, 39, 40

[56] References Cited
U.S. PATENT DOCUMENTS 4,223,341  9/1980  Drewery ............................ 358/11
4,855,815  8/1989  Yasuki et al. ..................... 358/31
5,051,818  9/1991  Mishima ............................ 358/31

FOREIGN PATENT DOCUMENTS
55-150687  11/1980  Japan .
58-111596   7/1983  Japan .
58-129891   8/1983  Japan .

Primary Examiner—James J. Groody
Assistant Examiner—Kim Yen Vu
Attorney, Agent, or Firm—Rosen, Dainow & Jacobs

[57] ABSTRACT

A luminance/chromaticity signal separation circuit for a composite video signal, consisting of one-line delayers, inverters, adders, multipliers, low-pass filters, subtractors, comparators, band-pass filters, and line comb filters, capable of exactly separating a luminance signal and a chromaticity signal by selectively using output signals which are adapted to vertical luminance variations.

3 Claims, 2 Drawing Sheets

LUMINANCE/CHROMATICITY SIGNAL SEPARATION CIRCUIT FOR COMPOSITE VIDEO SIGNAL

BACKGROUND OF THE INVENTION

The present invention relates to a composite video signal processing circuit for the NTSC color television system, more particularly, to a luminance/chromaticity signal separation circuit capable of exactly separating a luminance signal and a chromaticity signal by selectively using output signals of three line comb filters which are adapted to vertical luminance variations. FIG. 1 shows a conventional luminance/chromaticity signal separation circuit for a composite video signal comprising one-line delayers 1a-1d for sequentially delaying a composite video signal CV by one horizontal line, multipliers 4a-4c for multiplying output signals of the one-line delayers 1a-1c, multipliers 4d-4h for multiplying said composite video signal CV and the output signals of the one-line delayers 1a-1d respectively, adders 2a, 2b and 2c for adding output signals of said multipliers (4a-4c), (4f-4h) and (4d-4f), respectively, inverters 3a and 3b for inverting output signals of the adders 2b and 2c, subtractors 5a-5c for subtracting the output signals of said one-line delayers 1b-1d from the output signals of said one-line delayers 1a and 1b and said composite video signal CV, a minimum value detector 6 for detecting and generating as a select control signal the smallest one of the output signals of the subtractors 5a-5c, a selector 7 for selecting and outputting the output signal of said adder 2a and the output signals of said inverters 3a and 3b in accordance with the selection control signal of the minimum value detector 6, a band-pass filter for generating a chromaticity signal C with removing direct current components from the output signal of the selector 7, and a subtractor 9 for generating a luminance signal Y by subtracting said chromaticity signal C from the output signal of said one-line delayer 1b.

The operations of the conventional circuits will be described in detail as follows.

The composite video signal CV is sequentially generated with delaying by one line by one-line delayers 1a-1d, the output signals of the one-line delayers 1a-1c. Those out-puts are multiplied by $-\frac{1}{4}$, $\frac{1}{2}$, $-\frac{1}{4}$ by the respective multipliers 4a-4c and are added in the adder 2a. Then the signal outputted from adder 2a is applied to the terminal a of the selector 7. The output signals of the one-line delayers 1b-1d multiplied by $-\frac{1}{4}$, $\frac{1}{2}$, $-\frac{1}{4}$ by the respective multipliers 4f-4h are added in the adder 2b, and the output signal of the adder 2b is inverted by the inverter 3a and then applied to the terminal b of the selector 7. And also, the composite video signal CV and the output signals of the one-line delayers 1a and 1b are multiplied by $-\frac{1}{4}$, $\frac{1}{2}$, $-\frac{1}{4}$ by the respective multipliers 4d-4f and then added by the adder 2c. The output signal of the adder 2c is inverted by the inverter 3b and then applied to the terminal c of the selector 7.

In the meantime, the composite video signal CV from which the output signal of the one-line delayer 1b has been subtracted in the subtractor 5a is applied to the minimum value detector 6. The output signals of the one-line delayers 1a and 1b, from which the output signals of the one-line delayers 1c and 1d have been subtracted by subtractors 5a and 5c, respectively are applied to the minimum value detector 6.

As a result, the minimum value detector 6 detects and generates as a selection control signal the minimum one of the output signals of the subtractors 5a-5c. The selection control signal selects one of the output signals of the adder 2a and the inverters 3a and 3b from the selector 7.

Such a signal selected from the selector 7 is generated as a chromaticity signal c after removal of direct current components through the band-pass filter 8. The output signal of the one-line delayer 1b from which said chromaticity signal has been subtracted in the subtractor 9 appears as a luminance signal Y.

The composite video signal for the NTSC color television system in the form of a suppressed carrier modulation of a chrominance signal to a chrominance subcarrier is added to a luminance signal. The chrominance subcarrier has a phase difference of 180° between adjacent lines.

Even though the above-mentioned conventional circuit separates the luminance signal and the chromaticity signal by using characteristics of the composite video signal and the correlation between the adjacent lines, it has problems that, in case of vertical luminance variations as well as in case of a small variation of the luminance signal, an exact separation of the luminance signal and the chromaticity signal is not made because the correlation between adjacent lines is not obtained. Also, its configuration becomes complicated with use of a plurality of one-line delayers.

SUMMARY OF THE INVENTION

It is an object of the present invention to provide a luminance/chromaticity signal separation circuit for a composite video signal capable of exactly separating the luminance signal and the chromaticity signal even when a small variation of vertical luminance signal is present.

It is another object of the present invention to provide a luminance/chromaticity signal separation circuit for a composite video signal capable of exactly performing the separation of the luminance signal and the chromaticity signal with much simpler structures by using only two one-line delayers.

Such objects of the present invention can be attained by setting up three line comb filters which are adapted to respond to vertical luminance variations using two one-line delayers, comparing a line signal at present with preceding and following adjacent line signals, selecting an output signal from the line comb filter which has a smaller luminance difference when the luminance difference is above a certain level for the separation of the luminance signal and the chromaticity signal, and selecting an output signal from the line comb filter which uses all of the two one-line delayers when said luminance difference is below a certain level.

DETAILED DESCRIPTION OF THE INVENTION

A detailed description of the present invention will be given below with reference to the accompanying drawings.

Figure 1:
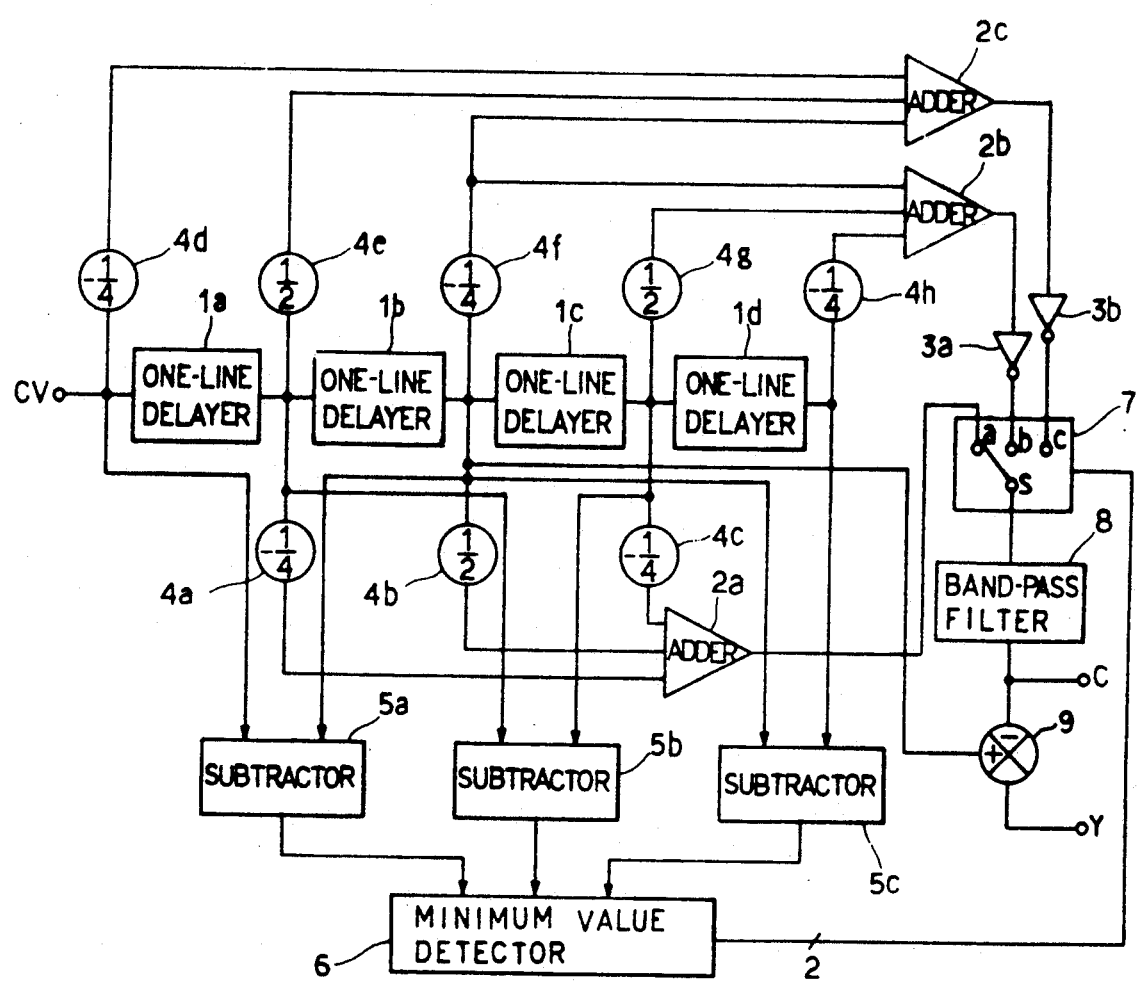
FIG. 1 shows a conventional luminance/chromaticity signal separation circuit for a composite video signal.
Figure 2:
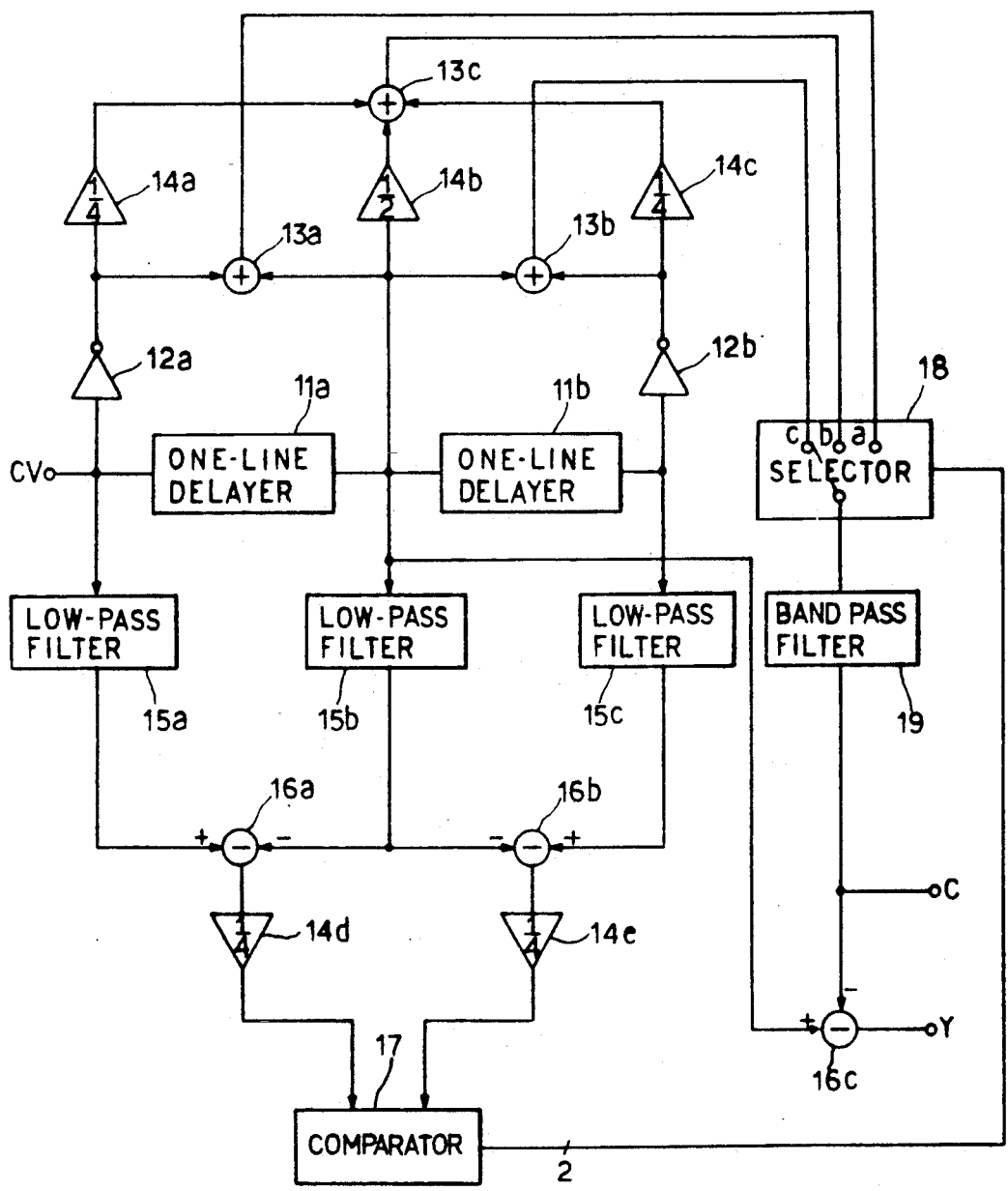
FIG. 2 shows a luminance/chromaticity signal separation circuit for a composite video signal according to the present invention.

FIG. 2 shows a luminance/chromaticity signal separation circuit for a composite video signal according to the present invention, consisting of one-line delayers 11a and 11b for sequentially delaying a composite video signal CV by one horizontal line, inverters 12a and 12b for inverting the composite video signal CV and the output signal of the one-line delayer 11b, adders 13a and 13b for adding the output signal of the one-line delayer 11a to the output signals of the inverters 12a and 12b, respectively, multipliers 14a, 14b and 14c for multiplying $-\frac{1}{4}$, $\frac{1}{2}$, $-\frac{1}{4}$ with the output signal of the inverter 12a, the output signal of the one-line delayer 11a and the output signal of said inverter 12b, respectively, an adder 13c for adding the output signals of the adders 14a–14c, low-pass filters 15a, 15b and 15c for passing only low frequency signals from the composite video signal CV and the output signals of the one-line delayers 11a and 11b, subtractors 16a and 16b for subtracting the output signal of the low-pass filter 15b from the output signals of the low-pass filters 15a and 15c, multipliers 14d and 14e for multiplying $\frac{1}{2}$, $\frac{1}{2}$ with the output signals of the subtractors 16a and 16b, a comparator 17 for comparing and producing as a select control signal the magnitudes of the output signals of the multipliers 14d and 14e, a selector 18 for selecting and generating the output signals of the adders 13a, 13b and 13c in accordance with the select control signal of the comparator 17, a band-pass filter 19 for removing direct current components from the output signal of the selector 18, passing only the chrominance subcarrier of 3.58 MHz and then generating as a chromaticity signal c, and a subtractor 16c for subtracting said chromaticity signal c from the output signal of the one-line delayer 11a and then generating as a luminance signal Y.

The operations and effects of the present invention having such a configuration will be described below in detail.

The composite video signal CV is sequentially generated with a delay of one line by the one-line delayers 11a and 11b, the composite video signal CV and the output signal of the one-line delayer 11b are inverted by the respective inverters 12a and 12b, and the output signals of the inverters 12a and 12b are added to the output signal from the one-line delayer 11a in the respective adders 13a and 13b. The resulting signals are applied to the terminals a and c of the selector 18. Also, the output signals from the inverter 12a, the one-line delayer 11a and the inverter 12b multiplied by $\frac{1}{4}$, $\frac{1}{2}$, $\frac{1}{4}$ by respective multipliers 14a, 14b and 14c. The resulting signals are added by adder 13c, and the output signal from the adder 13c is applied to the terminal b of the selector 18.

In the meantime, the high frequency signal which is the chromaticity signal component of the output signals of the one-line delayers 11a and 11b and the composite video signal CV can not pass through the low-pass filters 15a, 15b and 15c, but the low frequency signal which is the luminance component of the output signals of the one-line delayers 11a and 11b can pass through the low-pass filters 15a, 15b and 15c.

Accordingly, at this time, the output signals of the low-pass filters 15a, 15b and 15c become signals indicating a luminance level of three pixels which are vertically consecutive.

Such output signals of the low-pass filters 15a and 15c are subtracted from the output signal of the low-pass filter 15b in the respective subtractors 16a and 16b.

Accordingly, provided that the output signal of the one-line delayer 11a is a signal at present, a signal for the luminance difference between the present line and the preceding line is generated from the subtractor 16b. Also, a signal for the luminance difference between the present line and the following line is generated from the subtractor 16a, and the signals from the subtractors 16a and 16b are multiplied by $\frac{1}{2}$, $\frac{1}{2}$ by the respective multipliers 14d and 14e. To be multiplied by $\frac{1}{2}$ at this time results in removing the least 2 bits from the data bus of the input signal.

As above mentioned, the magnitudes of the output signals of the multipliers 14d and 14e are compared in the comparator 17. Three kinds of selection control signals are generated in accordance with the comparison result and then applied to the selector 18. That is, in case that the magnitude of the output signal of the multiplier 14d is smaller, above a certain value (for example, 3), than the magnitude of the output signal of the multiplier 14e, reversely, in case that the magnitude of the output signal of the multiplier 14e is smaller, above a certain value, than the magnitude of the output signal of the multiplier 14d, and in case that the difference between the magnitudes of the output signals of the multipliers 14d and 14e is below a certain value, a selection control signal generated from the comparator 17 is applied to the selector 18. According to this, the selector 18 selects as an output one of the signals applied to its terminals a, b and c which has the smallest luminance difference.

As an example, in the case when the magnitude of the output signal of the multiplier 14d is smaller than the magnitude of the output signal of the multiplier 14e as mentioned above, and the difference is more than a certain value, the output signal of the adder 13a applied to the terminal a of the selector 18 is selected as an output, in the case when the magnitude of the output signal of the multiplier 14e is smaller than the magnitude of the output signal of the multiplier 14d, and the difference is more than a certain value, the output signal of the adder 13b applied to the terminal c of the selector 18 is selected as an output by the selector 18, and in the case when the difference between the magnitudes of the output signals of the multipliers 14d and 14e is below a certain value, the output signal of the adder 13c applied to the terminal b of the selector 18 is selected as an output by the selector 18.

As mentioned above, the direct current component is removed while the output signal of the selector 18 passes through the band-pass filter 19, so that only the chromaticity signal c adjacent to 3.58 MHz is separated as an output. And also, at this time, since the chromaticity signal c is subtracted from the output signal of the one-line delayer 11a in the subtractor 16c, the luminance signal is separated as an output in the subtractor 16c.

As described above in detail, with the three line comb filters which are adapted to the vertical luminance variations by using two one-line delayers, the present invention can solve the problems caused by the case when the correlations between adjacent lines which are inherent to the line comb filter are less. In addition the present invention is composed of a less complex structure.

And also, the present invention is capable of exactly separating the luminance signal and the chromaticity signal from the composite signal by selecting one of the output signals of the line comb filters which use all of the two one-line delayers even in case of small vertical luminance variations.

What is claimed is:

1. A luminance/chromaticity signal separation circuit for a composite video signal comprising:

first and second one-line delayers connected to sequentially delay a composite video signal (CV) by one horizontal line;

first and second inverters connected to invert said composite video signal (CV) and the output signal of the second one-line delayer;

first and second adders connected to add the output signal of said first one-line delayer to the output signals of the inverters, respectively;

first, second and third multipliers connected to multiply predetermined values of said multipliers with the output signal of said first inverter, said first one-line delayer and said second inverter, respectively;

an adder connected to add the output signals of the first, second and third multipliers;

first, second and third low-pass filters connected to pass only low frequency signals from said composite video signal (CV) and the output signals of said one-line delayers;

subtractors connected to subtract the output signal of said second low-pass filter from the output signals of the first and third low-pass filters;

fourth and fifth multipliers connected to multiply predetermined values with the output signals of the subtractors;

a comparator connected to compare and produce, as a selection control signal, the magnitudes of the output signals of the fourth and fifth multipliers;

a selector connected to select and generate one of the output signals of said first, second and third adders in accordance with the selection control signal of the comparator;

a band-pass filter connected to remove direct current components from the output signal of the selector and generate only a chromaticity signal; and a subtractor connected to subtract said chromaticity signal from the output signal of said first one-line delayer and then generate a luminance signal.

2. The circuit as claimed in claim 1, wherein said comparator comprises means for generating first and second selection control signals when the magnitude of the output signal of the fourth multiplier exceeds or is smaller than the magnitude of the output signal of the fifth multiplier, respectively, and the difference exceeds a given value, and a third selection control signal when the difference between the magnitudes of the output signals of said fourth and fifth multipliers is below a certain value.

3. A signal processing circuit for processing a video signal, said circuit comprising:

input means connected to receive the video signal A;

delay means connected to the input means and having two delay outputs, the first delay output outputting a first output signal B generally equivalent to the video signal delayed by one line, and the second delay output outputting a third output signal C generally equivalent to the video signal delayed by two lines;

signal modifying means connected with the delay outputs of the delay means and receiving the output signals A, B and C therefrom, said signal modifying means having first, second, and third signal outputs outputting first, second, and third chromaticity signals D, E, and F, respectively related to the delay outputs A, B, and C generally as
   $D = B - A$,
   $E = -\frac{1}{4}(A) + \frac{1}{2}(B) - \frac{1}{4}(A)$, and
   $F = B - C$;

selector means connected with the signal outputs from the signal modifying means and having a control input means and a selector output outputting a selector signal, the selector means modifying the selector signal responsive to input received from the control input means to selectively be one of the signal outputs D, E, and F;

comparator means operatively associated with the delay outputs and receiving signals proportional to the difference between A and B and the difference between B and C therefrom and having a control signal output outputting a control signal;

said control signal output being connected to the control signal input of the selector means and transmitting said control signal thereto and controlling the selection of the output of the selector means; and means for subtracting the output signal B from the selector output signal, the subtractor means connected with the first delay output outputting the output signal B and the selector output of the selector means.

* * * * *